United States Patent Office 3,219,750
Patented Nov. 23, 1965

3,219,750
ELECTRICAL POWER SUPPLY CONNECTION ASSEMBLIES FOR MOVING MACHINERY
Sydney Davies, Woodford, Cheshire, England, assignor to The Adamson-Alliance Company Limited, London, England, a British company
Filed Nov. 29, 1961, Ser. No. 155,690
7 Claims. (Cl. 174—69)

The invention concerns electrical power supply connection assemblies for moving machinery and particularly, though not exclusively, relates to the provision of power feed lines for such machinery as overhead cranes and the like.

The need for supplying electrical power to the winding and driving motors of overhead cranes and particularly feeding power between the bridge and moving sections of the crane presents difficulties which have not been satisfactorily overcome and in view of the tendency for the complexity of overhead cranes (and the consequent number of power supply cables) to increase, the problem is likely to become more acute.

It is an object of the present invention to provide an improved electrical power supply connection assembly.

According to the present invention an electrical power supply connection assembly for moving machinery comprises one or more rigid frame members each pivotally supported and mounted for motion longitudinally of guide means, linkage means whereby each said frame member may be pivotally secured to the next adjacent frame member if appropriate, fixing means whereby the extreme frame members may be secured, on the one hand, adjacent a source of electrical power and, on the other hand, adjacent machinery to which the power is to be applied, said fixing means including an intermediate member pivotally secured to a support adjacent said source or said machinery as appropriate and to the end of a frame member, and means upon the assembly adapted to receive and retain power cables relative thereto.

An assembly in accordance with the invention preferably includes weighting means to assist in the return pivotal motion of the frame members.

In one arrangement in accordance with the invention, the extent of pivotal motion of the frame members is limited.

The invention will now be described further by way of example only with reference to the accompanying drawings illustrating one particular embodiment thereof in which.

An electrical power supply connection assembly for transmitting electrical power from the bridge of an overhead crane to the moving parts thereof comprises a plurality of rigid frame members 11 each pivotally supported at a point intermediate its ends upon a guide means 12, and adapted to locate and retain a requisite number of power feed lines in position relative to the frame, means 13 whereby adjacent frame members may be pivotally linked one to the other, and attachment means 14, 15 respectively whereby the remote ends of the interconnected frame members may be secured to the power supply (that is to say the bridge) and, on the other hand, to the machinery to which the power is to be led (that is to say the crab).

Figure 1:
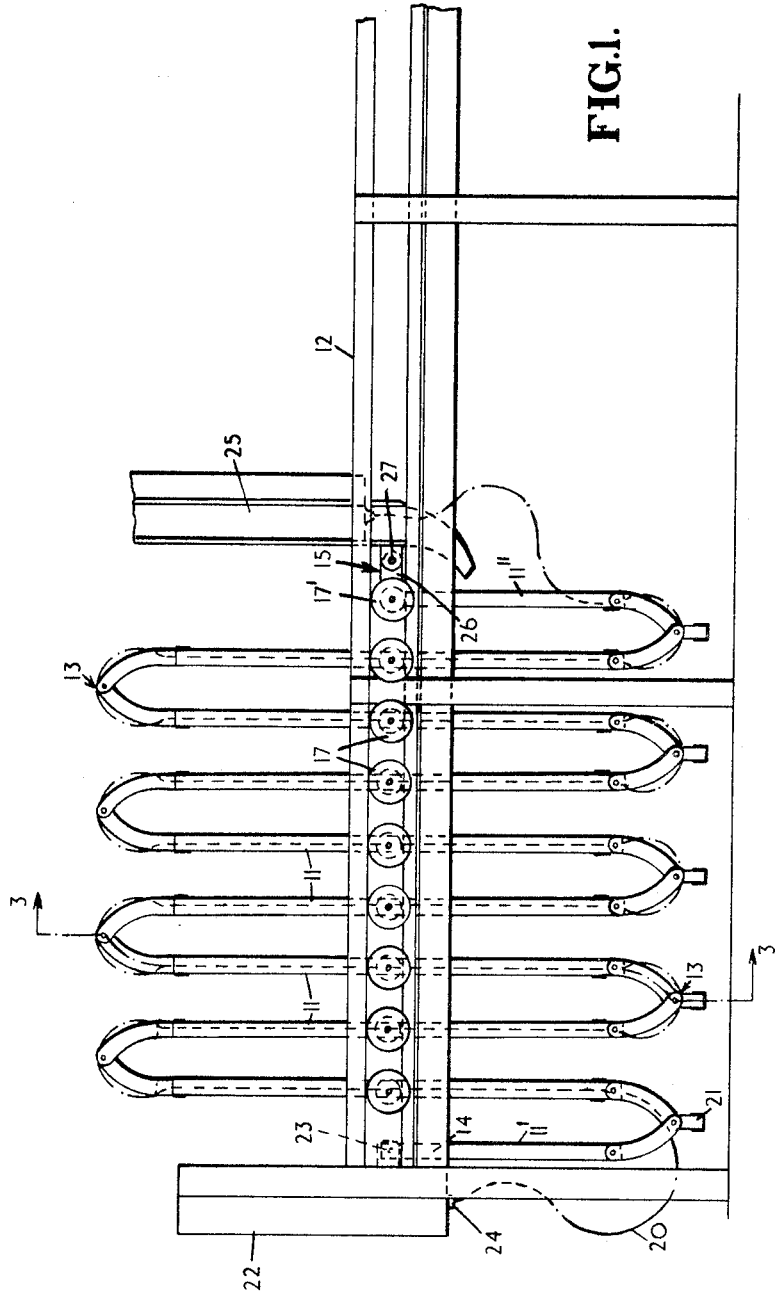
FIGURE 1 is a side elevation of a connection assembly in accordance with the invention, the assembly being in the retracted condition.
Figure 2:
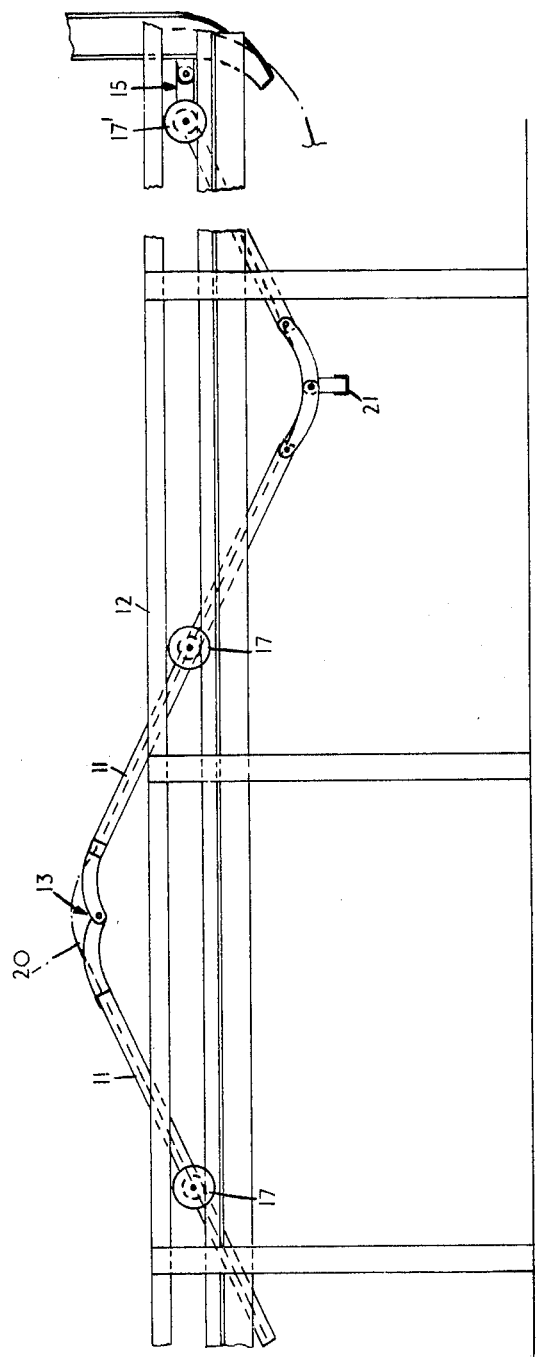
FIGURE 2 is a side elevation corresponding to FIGURE 1 in which the assembly is in extended condition.
Figure 3:
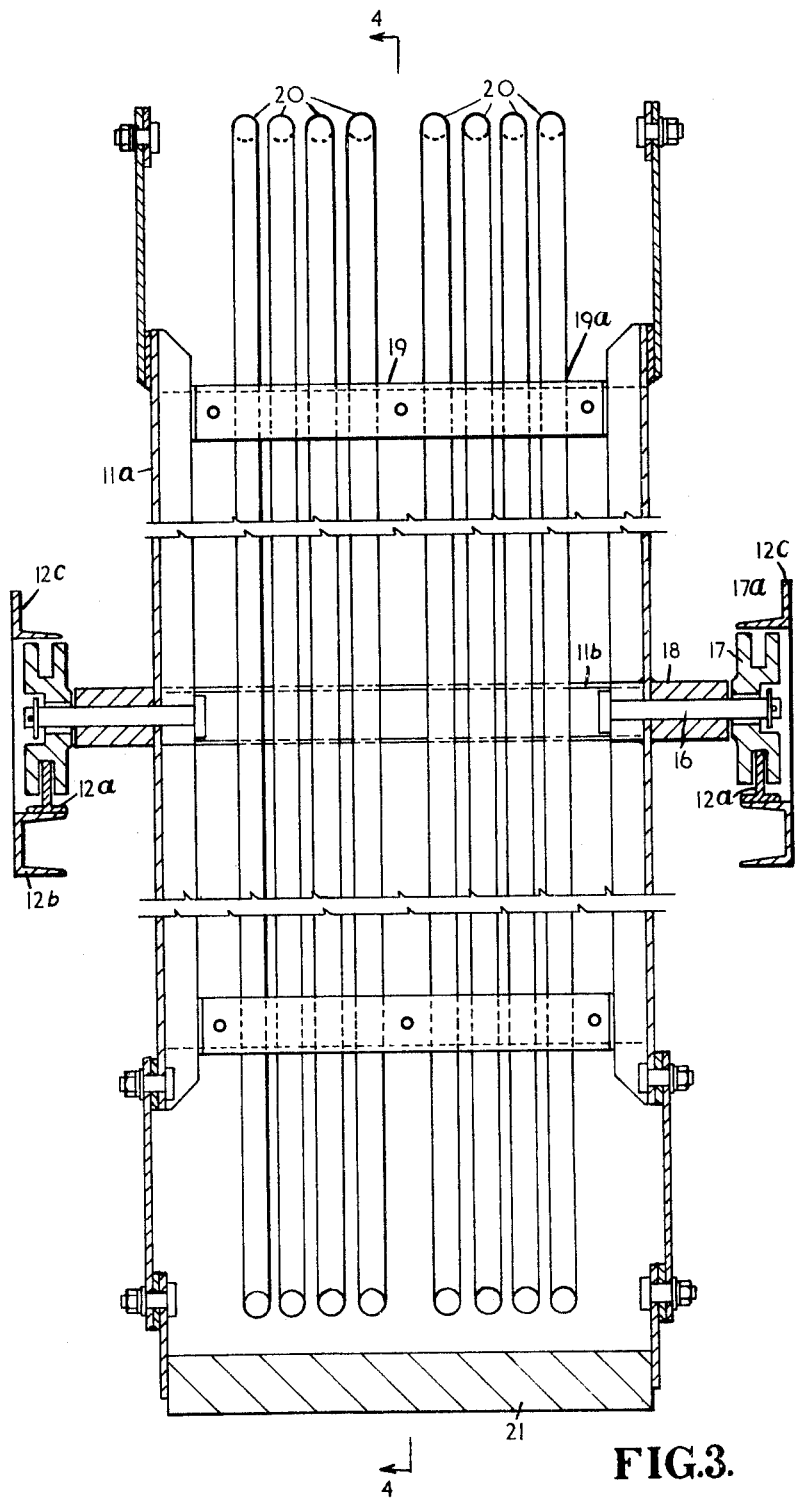
FIGURE 3 is a section on the line 3—3 of FIGURE 1.
Figure 4:
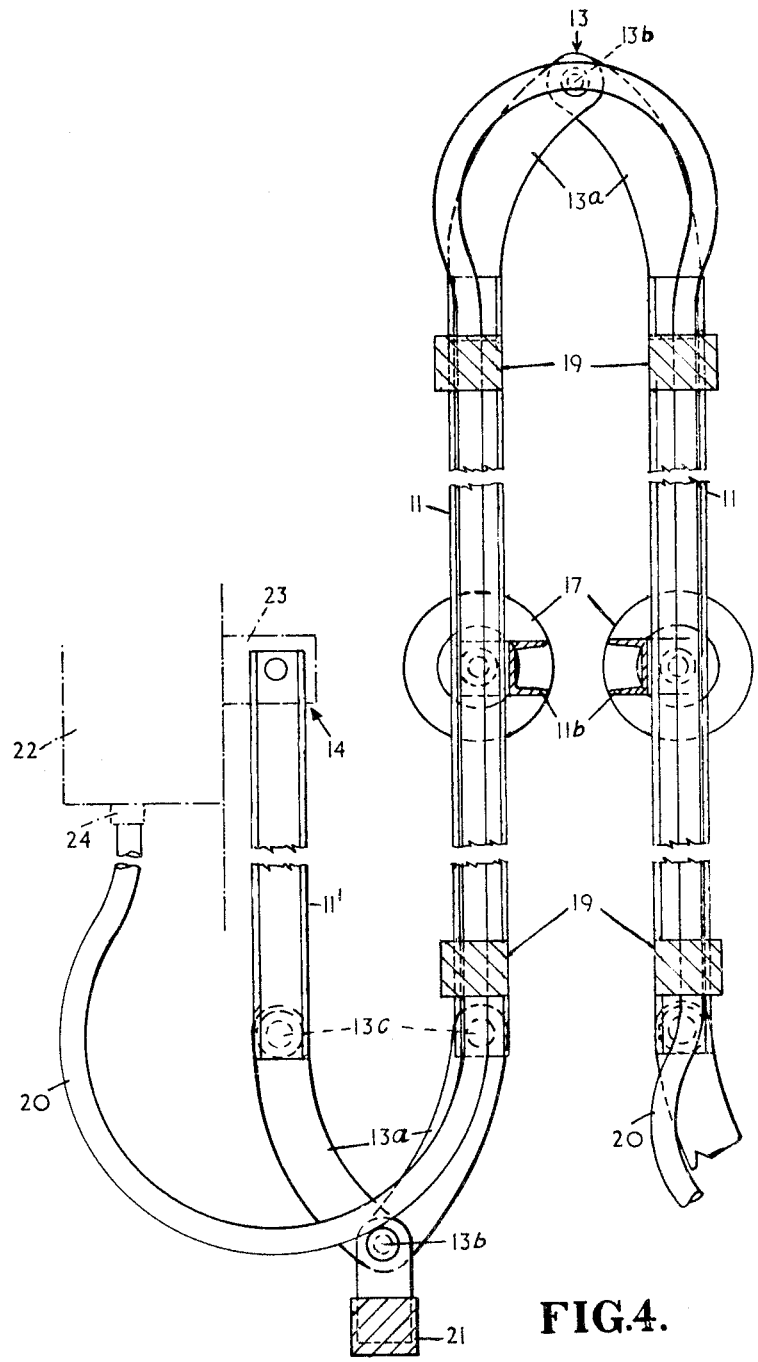
FIGURE 4 is a section of part of FIGURE 1 to a larger scale and looking in the direction 4—4 shown in FIGURE 3.

Referring now particularly to FIGURE 3 each frame member 11 comprises two parallel spaced apart channel members 11a maintained in such disposition by a further channel member 11b. A stub axle 16 extends outwardly from each channel member 11a and carries a runner 17 adjacent the remote end thereof, the said stub axles being disposed approximately midway along the length of each channel member. Each runner is mounted on an anti-friction or other like bearing. The periphery of each runner is grooved as at 17a for a purpose yet to become apparent. A sleeve 18 is disposed co-axially with each stub axle and serves to locate the runner 17 relative to the channel member 11a.

Adjacent each end of the frame member 11 and disposed between the members 11a is a cable cleat 19, such cleat being adapted to receive and retain a requisite number of power cables. The cleat 19 is split longitudinally, the line of join being directed diametrically of holes 19a through which the cables 20 pass.

The guide means 12 consists of two parallel spaced apart assemblies each comprising an inverted T-section member 12a disposed along the proposed path of travel of the frame members 11 and supported upon an appropriate rigid base framework 12b. An L-section member 12c is disposed above and parallel to the T-section member. The peripheral channel 17a in each wheel 17 engages the central limb of the T-section member 12a to form a guide, the L-section member 12c preventing the wheel 17 from lifting out of engagement with the T-section member.

The means 13 whereby adjacent frame members may be linked together comprises an arcuate link 13a at each end of each channel member 11a and a pivot pin 13b between corresponding such links. The upper links 13a are welded to the appropriate channel member whereas those at the lower end of the frame are pivotally connected by a pivot pin 13c. The lower links also carry weights 21 to facilitate the closing of the device, although in some instances the weights 21 may be omitted. The attachment means 14 whereby one remote end of the connected frame members 11 may be joined to a fixed part say, a bridge 22 comprises a half frame member 11' similar in form to those previously described save in that the upper portion and the runners are omitted, such member 11' being pivotally secured to a lug 23 on the said bridge. The cables 20 are fed to the bridge as at 24.

The attachment means 15 whereby connection to the machinery is effected is also made through a half frame member 11'' although in this instance the member 11'' has runners 17' assembly moving along the guide means. Between the remote end of the half frame member 11'', and a collector tower 25 mounted on the machinery is a short attachment member 26 said member 26 being pivotally connected to, on the one hand the half frame member 11'' and, on the other hand, to lugs 27 on the collector.

The cables 20 are led from a connecting-in chamber on the bridge 22 to the cleat 19 at the lower end of the first frame member 11 and thence to the cleat at the upper end of such member. The cables then pass to the upper cleat 19 on the next adjacent frame member and, by a similar path, throughout the length of the whole assembly until the cable 20 is eventually led to the collector tower 25.

In operation upon movement of the collector tower 25, the lugs 27 draw the interconnected frame members longitudinally of the guide means 12, the runners 17 supporting the individual frame members being progressed along the T-section members 12a and the frame members themselves pivoting about the rotational axis of the runners. Thus the effective length of the power feed cables will be adjusted in accordance with the position of the collecting tower in relation to the connecting-in chamber.

The assembly according to the present invention is of particular application to such overhead cranes as are widely used in the steel-making industry and possess the very distinct advantage that a comparatively large number of individual cables may be carried without any need for providing additional insulation between cables. Furthermore, the space required by such an assembly is less than that which would be required by more conventional arrangements of the same cable carrying capacity. A very important advantage of the assembly according to the present invention stems from the fact that there is no need to provide sliding contacts and the like whereby a connection might be made with a power supply and thus high resistance connections such as are frequently met with when sliding contacts are used are avoided.

The invention is not restricted to the particularly features of the present embodiment since alternatives will readily present themselves to one skilled in the art. For example, in some applications of the invention a single frame member might suffice, such frame member being pivotally connected to fixing members which are, in turn, pivotally secured to a connecting-in chamber or to a collector tower as appropriate.

In a further embodiment the linkage means for the connecting together of adjacent frame members may be constituted by the elements of such frame members, said elements being so formed as to constitute, in effect, a cranked extension, the extension being adapted to receive spindles and cleats.

What I claim is:

1. The combination of movable machinery, an electrical power connection assembly in said machinery and comprising a plurality of pivotally interconnected frame members, guide means for said frame members and including a track, means for supporting said frame members pivotally on said guide means, said supporting means being movable longitudinally of the guide means and including rotatable runner wheels running on the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

2. The combination of movable machinery, an electrical power connection assembly in said machinery and comprising a plurality of pivotally interconnected frame members, guide means for said frame members and including a track, means for supporting said frame members pivotally on said guide means, said supporting means being movable longitudinally of the guide means and including rotatable runner wheels running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

3. The combination of movable machinery, an electrical power connection assembly in said machinery and comprising a plurality of pivotally interconnected frame members, guide means for said frame members and including a track constituted by an upturned edge member, means for supporting said frame members pivotally on said guide means, said supporting means being movable longitudinally of the guide means and including rotatable peripherally-grooved runner wheels running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

4. The combination of movable machinery, an electrical power connection assembly in said machinery and comprising a plurality of frame members, arcuate link elements secured to the frame members and being secured together by pivot pins so as to pivotally join adjacent frame members, guide means for said frame members and including a track constituted by an upturned edge member, means for supporting said frame members pivotally on said guide means, said supporting means being movable longitudinally of the guide means and including rotatable peripherally-grooved runner wheels running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

5. The combination of movable machinery, an electrical power connection assembly in said machinery and comprising a plurality of frame members, arcuate link elements pivotally joining the frame members for movement in a vertical plane, the link elements at the upper ends of the frame members being firmly secured thereto and the link elements at the lower ends of the frame members being pivotally secured thereto, guide means for said frame members and including a track constituted by an upturned edge member, means for supporting said frame members pivotally on said guide means, said supporting means being movable longitudinally of the guide means and including rotatable peripherally-grooved runner wheels running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

6. The combination of movable machinery, an electrical power connection assembly in said machinery and comprising a plurality of frame members, arcuate link elements pivotally joining the frame members for movement in a vertical plane, the link elements at the upper ends of the frame members being firmly secured thereto and the link elements at the lower ends of the frame members being pivotally secured thereto, weights secured to the lower link elements to assist in the return motion of the frame members, guide means for said frame members and including a track constituted by an upturned edge, means for supporting said frame members pivotally on said guide means, said supporting means being movable longitudinally of the guide means and including rotatable peripherally-grooved runner wheels running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and means on the frame members adapted to retain at least one power cable relative thereto.

7. The combination of movable machinery, an electrical power connection assembly in said machinery and comprising a plurality of frame members, each consisting of two parallel, spaced apart, rigid members, a stub axle extending outwardly from substantially mid-way along each rigid member, arcuate link elements pivotally joining the frame members for movement in a vertical plane, the link elements at the upper ends of the frame members being firmly secured thereto and the link elements at the lower ends of the frame members being pivotally secured thereto, weights secured to the lower link elements to assist in the return motion of the frame members, guide means for said frame members and including a track constituted by an upturned edge, means for supporting said frame members pivotally on said guide means, said supporting means being movable longitudinally of the guide means and including rotatable peripherally-grooved runner wheels carried on the stub axles and running on the track, a retaining member which prevents the wheels from leaving the track, said frame members being arranged in a zig-zag so that alternate frame members remain parallel to one another whereas the angle between adjacent members varies with movement of said machinery, fixing means whereby the two extreme ends of the interconnected frame members are secured adjacent respectively, a source of electrical power and the movable machinery, and a multiple cable cleat adjacent each end of the rigid members and disposed therebetween to retain at least one power cable relative thereto.

References Cited by the Examiner

UNITED STATES PATENTS

| | | | |
|---|---|---|---|
| 1,060,950 | 5/1913 | Schwarz | 248—277 |
| 2,571,832 | 10/1951 | Chapin | 191—12 |
| 2,858,381 | 10/1958 | Goldberg et al. | 174—69 X |
| 2,864,907 | 12/1958 | Waninger | 174—69 X |

FOREIGN PATENTS

| | | |
|---|---|---|
| 189,261 | 3/1957 | Austria. |
| 1,091,165 | 10/1960 | Germany. |

JOHN F. BURNS, *Primary Examiner.*

JOHN P. WILDMAN, DARRELL L. CLAY,
*Examiners.*